April 30, 1968  C. RENSHAW  3,380,252

INSTALLATION FOR PRESERVING FRESH-WATER SUPPLY

Filed March 18, 1965

INVENTOR:
Clarence Renshaw
BY
Karl G. Ross
Attorney

United States Patent Office 3,380,252
Patented Apr. 30, 1968

3,380,252
INSTALLATION FOR PRESERVING
FRESH-WATER SUPPLY
Clarence Renshaw, 45 Sutton Place S.,
New York, N.Y. 10022
Filed Mar. 18, 1965, Ser. No. 440,771
1 Claim. (Cl. 61—1)

ABSTRACT OF THE DISCLOSURE

Impermeable underground barrier extending partly into the ground water below the soil surface to confine an area of an accumulating precipitation without materially impeding the communication between ground water inside and outside the barrier.

My present invention relates to a method of preserving a supply of fresh water in the soil of a region where, in spite of adequate natural precipitation, existing wells cannot satisfy the needs of the inhabitants on account of periodic or progressive encroachment of salt water. The invention also extends to an installation for this purpose.

In a study by J. Ormond Riddel entitled, "Excluding Salt Water From Island Wells," published July 1933 in Civil Engineering, vol. 3, No. 7, pp. 383-385, it has been shown that the ground-water table in such regions rises and falls with the tides (though with a certain time lag relative thereto) and also varies locally with the rate of precipitation but that rainfall raises the table only temporarily since the excess fresh water soon seeps out laterally toward the ocean or inland waterways. Fresh water, by reason of its lighter weight, tends to float on the underlying salt water whose level is largely determined by the sea, varying in the aforedescribed manner with the tides; this fresh water thus forms a layer whose depth decreases progressively toward the coast and is determined, in general, by the resistance of the soil to horizontal penetration.

An important object of my present invention is to provide a method of and means for substantially preventing the loss of the fresh-water surplus available from precipitation and utilizing this surplus to counteract the intrusion of brackish or salt water into the water supply of selected regions.

Another important object of this invention is to provide a method of and means for efficiently storing water and other liquids (e.g., oil) at an underground location.

In accordance with this invention I prevent the escape of accumulated fresh water from a given area by erecting an impermeable underground barrier along a closed line around this area to halt the horizontal seepage of fresh water out of or salt and brackish water into such area; this barrier must reach into the ground water, advantageously below the salt-water table, and to prevent unwanted intrusion must also extend above the high point of the ground-water table, i.e., above the highest level normally reached by the supernatant layer of fresh water, to an extent sufficient to guard against inrush of water crests due to high waves or storm tides. Moreover, I prefer to terminate the barrier within the ground at some distance below the surface in order not to interfere with the normal water distribution and irrigation of the surface.

The impermeable barrier according to my invention may also serve as a storage space for liquids other than ground water, especially liquids such as oil which float on the ground-water table; the latter, accordingly, replaces the solid bottom of conventional cisterns or underground tanks.

Figure 2:
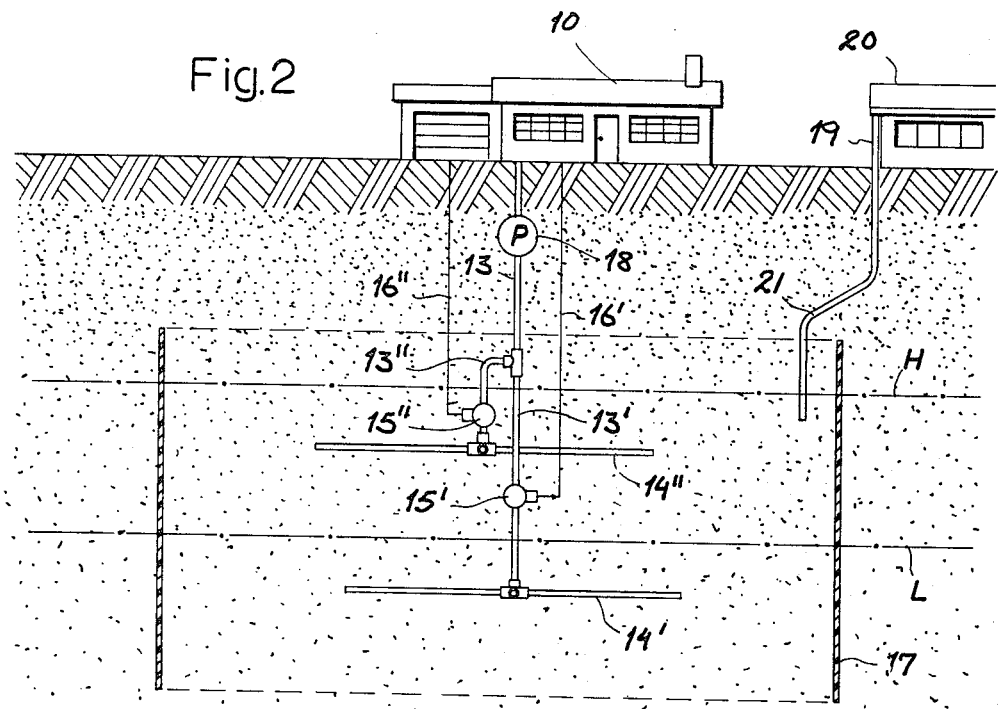
Figure 1:
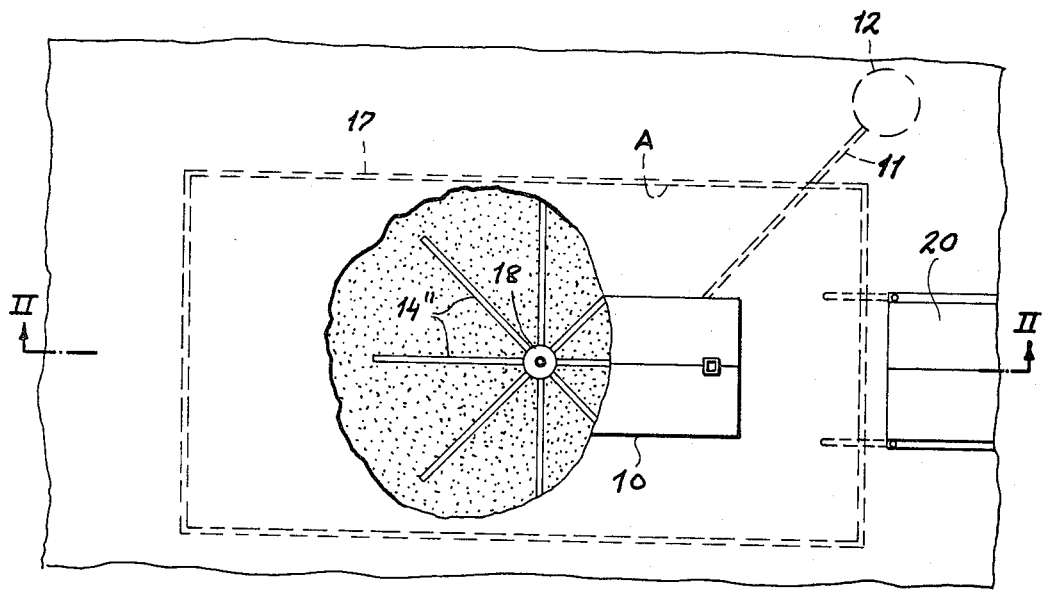

The invention will be described hereinafter in greater detail, reference being made to the accompanying drawing in which:

FIG. 1 is a plan view, partly in section, of an area bounded by an underground barrier according to the invention; and FIG. 2 is a cross-sectional view taken on line II—II of FIG. 1.

In FIG. 1 I have indicated at A an area, here rectangularly, calculated to receive enough precipitation to satisfy the needs of the occupants of a residence or industrial plant, or a community, represented by a building 10 which could be located either inside or outside that area. Wastes from the building are disposed of at a safe distance, e.g., by means of a pipe 11 leading to a septic tank 12 outside area A. The building 10 relies for all or part of its water supply upon a well 13 including a pump 18, well 13 being constituted by a vertical pipe branching out into substantially horizontal open-ended conduits 14' at a lower level and similar conduits 14" at a higher level. The open ends of these conduits thus serve as an array of well points distributed over a substantial part of area A since, as noted in the aforementioned article by J. O. Riddel, such distribution will minimize the tendency of the underlying layer of salt water to form a cone at the location of a well point. The conduits 14', 14" are joined to the pipe 13 by extensions 13' and 13" thereof which include respective solenoid valves 15' and 15" controlled from the surface via circuits 16', 16". A horizontal line L represents the normal low-water mark of the ground-water table whose high-water mark has been indicated by a horizontal line H.

In accordance with this invention I confine the area A by an impermeable barrier 17 bounding the outline of that area within the soil, the height of this barrier being greater than the difference between levels H and L. Barrier 17 may advantageously consist of a continuous sheet or band of impervious synthetic resin, such as polyethylene or plasticized polyvinylchloride, and is shown to extend within the permeable soil from a level below the low-water mark L to a level above high-water mark H. In practice, with tidal and climatic conditions similar to those prevailing around Long Island, N.Y., the height of the barrier 17 may range upwards of about 5 feet or 1.5 meters. It is important to note that the volume encompassed by barrier 17 is open both at the bottom and at the top; thus, the ground water within the barrier communicates with the ground water on the outside, rising and falling with it.

The array of well points represented by conduits 14' is located between the lower end of barrier 17 and the level L whereas the array of well points represented by conduits 14" is disposed between levels L and H. While the array 14' will always be submerged, it can happen during periods of high salt-water table (thus at some time after high tide) that the water drawn through this array turns brackish or salty. When this occurs, solenoid valve 15' is closed and valve 15" is opened so that pump 18 delivers only fresh water from the higher level. On the other hand, in times of shortage the ground-water table will be close to mark L so that the conduits 14" run dry, hence it will then be necessary to close the valve 15" and re-open the valve 15'.

The head of fresh water confined within barrier 17, rising higher than would be the case in the absence of the barrier, tends to depress the underlying salt-water table so as to reduce the salinization of the lower layers of the ground water within the area.

In FIG. 2 I have also illustrated the possibility of introducing into the ground, within the confines of barrier 17, a liquid from an external source here represented by a gutter 19 from an outlying building 20. A pipe 21 carries the runoff from gutter 19 into the soil and discharges below the upper edge of the barrier, thus into the region of the ground water. If a liquid lighter than water (e.g. oil) is so introduced, it will float on the ground-water table until withdrawn. Also, liquids so stored or trapped within the confines of the barrier will be prevented from contaminating adjacent grounds or waterways.

It will be evident that the shape of the barrier may be varied in conformity with existing conditions; in particular, its walls need not extend precisely vertically as illustrated in FIG. 2 but could be slightly inclined, e.g. with an upward divergence. Moreover, a wide choice of naturally occurring or synthetic materials are available for construction of the barrier. My invention, accordingly, is not limited to the specific arrangement described and illustrated except as specified in the appended claim.

I claim:

1. An installation for preserving a supply of fresh water in permeable soil subject to horizontal seepage and to salinization of the runoff from nautral precipitation by a varying underground table of salt water, comprising an upwardly and downwardly open impermeable underground barrier extending within said soil partly into the salt water along a closed line surrounding a soil-filled area subject to precipitation, said barrier rising from a depth below the normal low point of the salt-water table to a level above the normal high point of the supernatant layer of fresh water, an array of well points distributed over a substantial part of said area within said barrier and terminating within the confines of said barrier for pumping ground water to the surface, said well points being located at a plurality of levels including a first level below said low point and a second level between said low and high points, and valve means selectively operable for switching from one level of well points to another.

References Cited

UNITED STATES PATENTS

| | | |
|---|---|---|
| Re. 25,199 | 7/1962 | Brownell. |
| 599,971 | 3/1898 | Millstine. |
| 744,694 | 11/1903 | Sewall. |
| 1,159,055 | 11/1915 | Lowe. |
| 1,805,993 | 5/1931 | Miller _____ 61—11 X |
| 2,337,472 | 12/1943 | Kares. |
| 3,090,202 | 5/1963 | Spickard _____ 61—28 |
| 3,199,592 | 8/1965 | Jacob _____ 166—42 |
| 3,323,309 | 6/1967 | Dobell _____ 61—1 |

EARL J. WITMER, *Primary Examiner.*